United States Patent [19]

Woods

[11] 3,959,070

[45] May 25, 1976

[54] METHOD OF OPERATING A NEUTRONIC REACTOR

[75] Inventor: Wallace K. Woods, Richland, Wash.

[73] Assignee: The United States of America as represented by the United States Energy Research and Development Administration, Washington, D.C.

[22] Filed: Nov. 18, 1952

[21] Appl. No.: 321,080

[52] U.S. Cl. .................................. 176/30; 176/31
[51] Int. Cl.² ........................................ G21C 19/20
[58] Field of Search .............................. 204/154.2; 107/56 (U.S. only), 55 (U.S. only), 57 (U.S. only); 176/30, 31, 32, 59, 61

[56] References Cited
OTHER PUBLICATIONS

Nucleonics, Feb. 1950, pp. 54, 55 and 63.
Atomics, June 1951, pp. 176–180.

*Primary Examiner*—Samuel W. Engle
*Assistant Examiner*—S. A. Cangialosi
*Attorney, Agent, or Firm*—Dean E. Carlson; Arthur A. Churm; Marshall Burmeister

EXEMPLARY CLAIM

1. A method of operating a reactor having an active portion of a given length between a charging end and a discharging end, a first end region of the reactor extending from the charging end for one-quarter to one-third of said given length, a second end region extending from the discharging end for one-quarter to one-third of said given length, and a middle region extending between said end regions, said method comprising the steps of inserting end to end in the active region through the charging end a first group of bodies filling the middle region and a second group of bodies filling the first end region, irradiating the first and second groups of bodies while in the middle and first end regions, removing the first group from the reactor through the second end region, shifting the second group through the middle region to the second end region, inserting new first and second groups of bodies through the charging face into the middle and first end regions of the reactor, respectively, and irradiating the original second group and the new first and second groups while in the second end, middle, and first end regions, respectively, removing the original second group and the new first group from the reactor through the second end region, shifting the new second group through the middle region to the second end region, and irradiating the new second group again, whereby the first groups of bodies are irradiated only once and the second groups are irradiated twice.

1 Claim, No Drawings

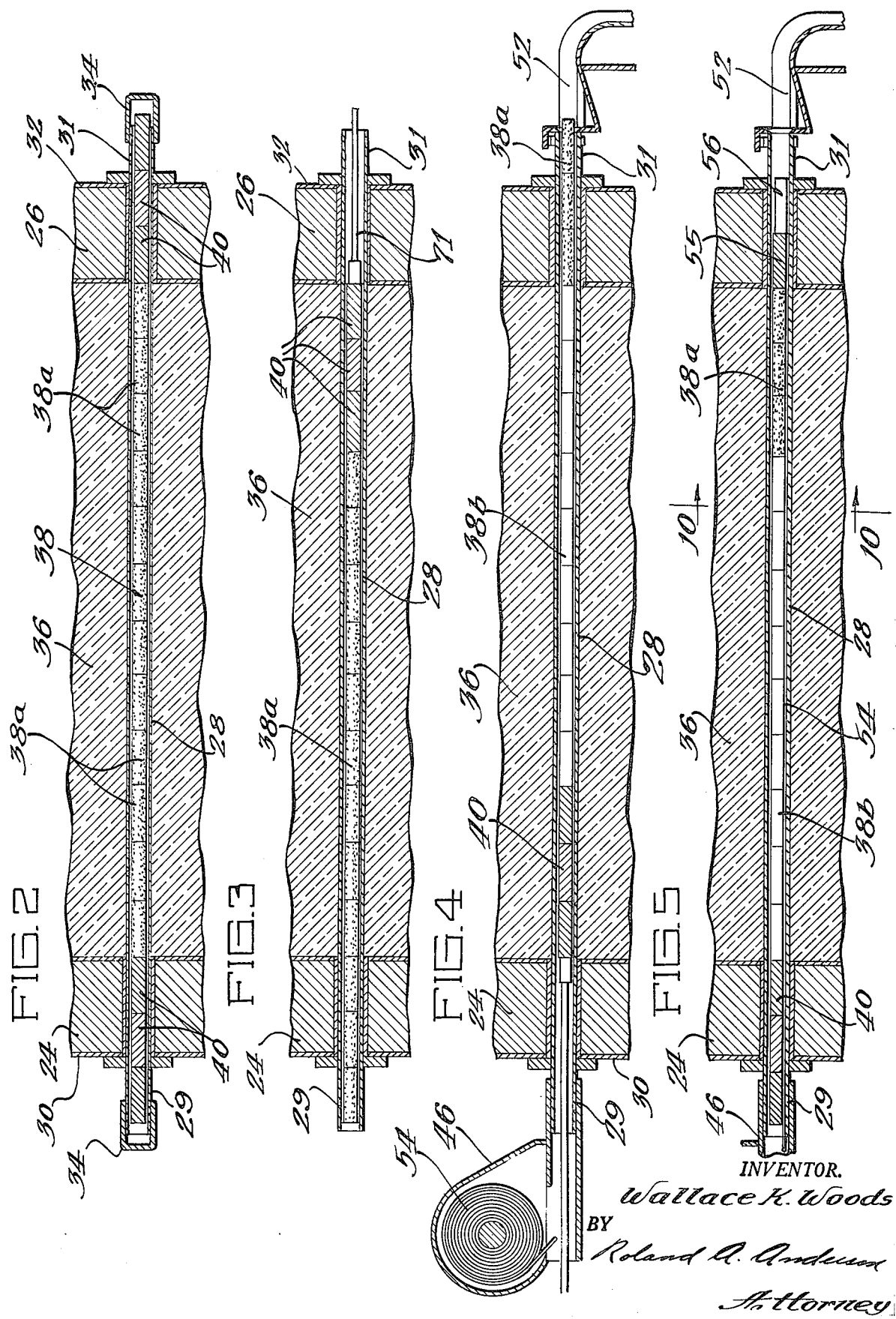

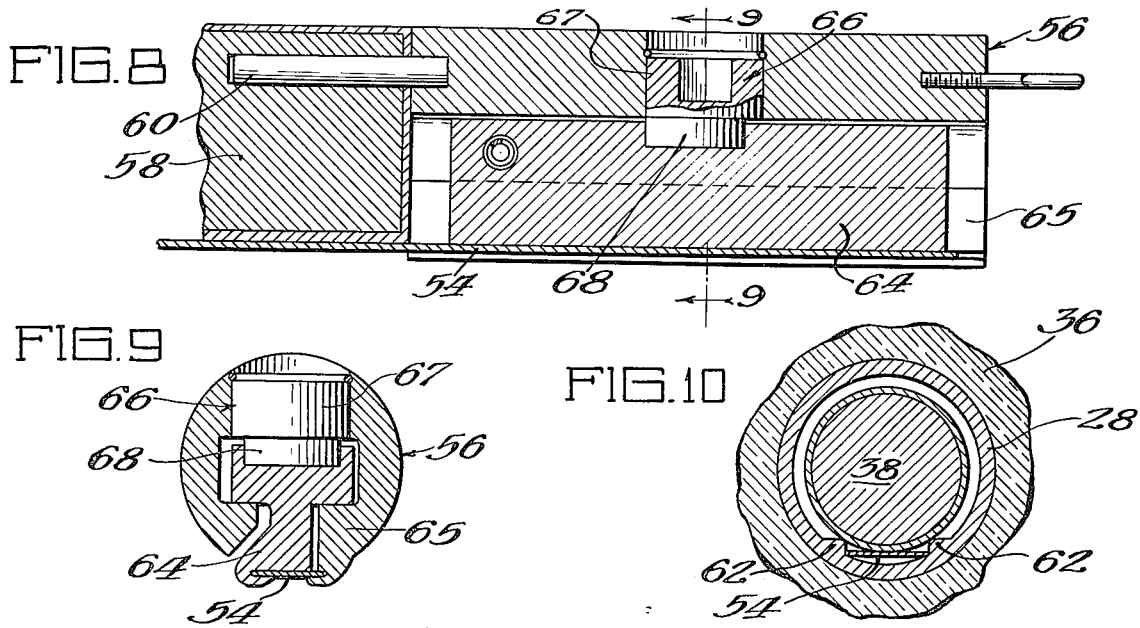
FIG.8
FIG.9
FIG.10
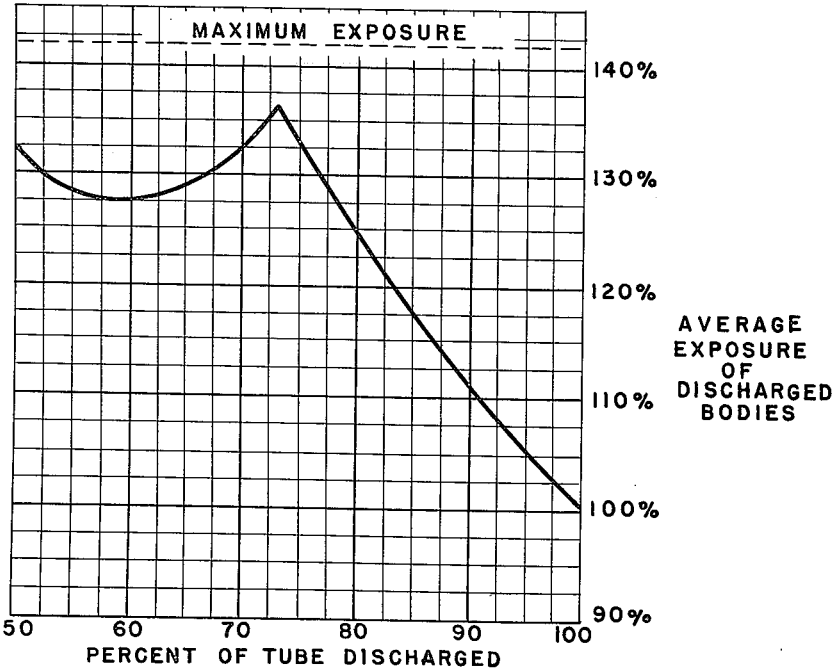
FIG.6
MAXIMUM EXPOSURE
AVERAGE EXPOSURE OF DISCHARGED BODIES
PERCENT OF TUBE DISCHARGED
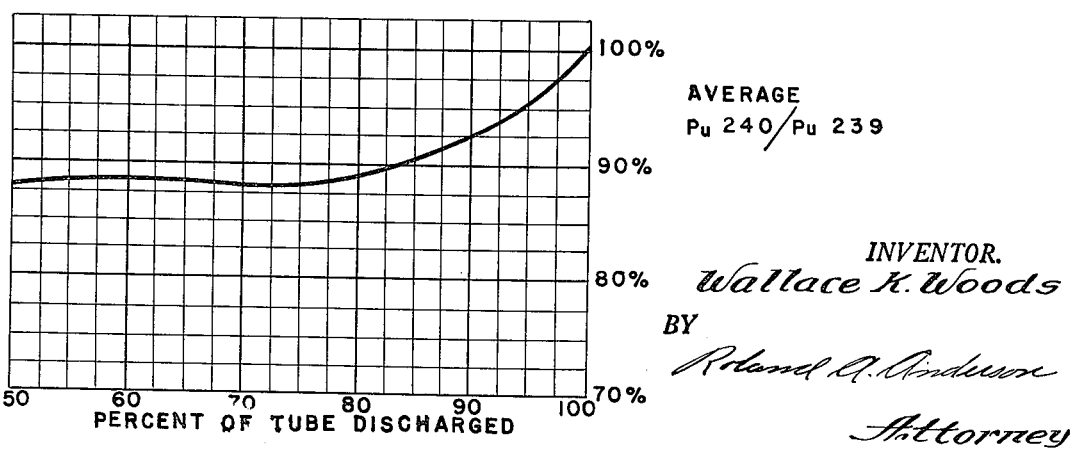
FIG.7
AVERAGE Pu 240/Pu 239
PERCENT OF TUBE DISCHARGED
INVENTOR.
Wallace K. Woods
BY
Roland A. Anderson
Attorney

METHOD OF OPERATING A NEUTRONIC REACTOR

The present invention relates to methods of irradiating bodies in the process tubes of a neutronic reactor, and more specifically to improved methods of segmented operation of neutronic reactors of this type.

The neutron flux density within most of the presently constructed neutronic reactors is a maximum at the center of the active portion of the reactor, and decreases in the region of the periphery of the active portion of the reactor. Theoretically, reactors with continuous active portions have maximum neutron flux densities at the center of the active portion, and the neutron flux density decreases as a cosine function to zero at the periphery of the active portion. It is clear, that any body irradiated in a single location within the active portion of a neutronic reactor in which the neutron flux density is a maximum at the center of the active portion will receive a radiation dose which is a function of the location of the body within the reactor and the length of its exposure period. Efforts have been made to somewhat "flatten" the neutron flux density distribution across the axes of a neutronic reactor in order to minimize the differences in radiation dosage that two samples receive in different portions of the reactor, however, such efforts have not been completely successful. Flattening the neutron density distribution also is undesirable from a shielding viewpoint, since the neutron flux at the periphery of the reactor would then be greater.

Many neutronic reactors have been constructed to irradiate materials in tubes traversing the active portion of the reactor, the tubes being termed "process tubes" in the art. It is generally most convenient to charge these process tubes with the bodies to be irradiated from one end and to discharge the bodies from the other end of the process tubes, the materials merely by being pushed through each tube from the charging end by inserting a new charge into the process tube. If the materials to be irradiated could merely be pushed through the tubes at a constant rate, it is clear that all samples of the material passing through a given tube would be irradiated with the same dose regardless of the neutron flux density distribution along the length of the tube. Such a "continuous flow" system for irradiating samples has not been practical in the present reactors, because of the necessity of flowing a fluid coolant over the samples in order to carry away the excess heat generated by the absorption of particles and radiations in the irradiated bodies, particularly when a liquid coolant is utilized which requires the use of caps on the ends of each tube. Even in the case where a coolant is not required, the continuous flow method of irradiating materials has not been used because of the radiation which escapes from the active portion of the reactor through the open tube ends. The greater the level of neutron flux, the greater will be the difficulty in preventing the escape of neutrons and other radiations from the open ends of the tubes, and hence the continuous flow method of sample irradiation becomes unduly difficult in reactors operated at high power levels.

As a result of the problems arising from the cooling and shielding necessities, it has been customary to charge the bodies to be irradiated into a reactor process tube only when the reactor is shut down, and the flow of coolant reduced to permissible limits. Generally, the reactor is shut down to charge each tube individually. With a given period of exposure the total exposure of each body within a process tube is determined by the total neutron flux passing through the body, and is a function of the distance the given tube is from the center of the neutron chain reaction, the position of the body within the tube, and the neutron flux level at which the neutronic reactor is being operated. Hence, the interval between charging and discharging each process tube of a neutronic reactor is different for different tubes, thus requiring the neutronic reactor to be shut down many times during the irradiation of a single batch of bodies disposed in the various process tubes of the reactor.

Since the process tubes traverse the active portion of the reactor, the radiation dose received by a body near the periphery of the active portion will be much less than the dose received by a body in the same process tube at its nearest point to the center of the neutronic chain reaction. For this reason, the total exposure received by the bodies in a given process tube is limited by the maximum permissible exposure of the body at the point of highest neutron flux density in the process tube. The permissible exposure of any body is generally limited by integrated flux density which the body can undergo without excessive physical deterioration, but other factors, such as temperature or contaminant formation, may be limiting. Hence, it is clear that the period of exposure is limited by the maximum exposure of the body at the point of highest neutron flux density, and since this is approximately at the center of each process tube, it is also clear that the bodies near the ends of the process tube can never receive a maximum radiation dosage with a single period of exposure.

The maximum average radiation dosage which the bodies may receive in a given process tube of a neutronic reactor may be increased without increasing the radiation dose received by the most highly irradiated body in the process tube of the reactor by segmentally charging the process tubes. Instead of completely replacing the old bodies in the process tube with new bodies after a single exposure period, only a segment of the tube is filled with new bodies, and the remaining bodies which have been partially irradiated are permitted to remain in the process tube for another period of irradiation. In this manner, at least some of the bodies are irradiated through more than one exposure period and receive an accumulative dose greater than the dose they would have received had they been allowed to remain in their original position through only one period of exposure. This method of operating has been termed "segmented operaton" of the reactor.

It is of course clear, that segmented operation of a neutronic reactor requires the reactor to be shut down and started up a plurality of times for each process tube in order to irradiate a single batch of bodies, rather than merely one start up and shut down as required when using a single exposure period. Considerable labor and time are required to shut down and start up a neutronic reactor, and it has generally been thought to be too expensive in economic terms to increase the number of operational shutdowns substantially. For this reason, the discharge of a segment less than 50 percent of the total charge of a process tube has been considered to be undesirable. Further, the increase in the average radiation dose received by the bodies in a process tube as a result of discharging a segment less than 50 percent is not considered to be sufficient to make the additional shutdown time economically feasible.

One of the objects of the present invention is to provide methods of operating a neutronic reactor which will yield the maximum average radiation dose for the bodies being irradiated within the neutronic reactor in which not more than two exposure periods are used for the bodies.

It is also an object of the present invention to provide methods of operating a neutronic reactor in which bodies are irradiated through not more than two exposure periods and in which the total radiation dose received by a body in a given process tube traversing the active portion of the reactor will be more nearly the maximum radiation dose received by any body within the process tube.

Other objects and advantages of the present invention will become readily apparent to the man skilled in the art upon a further reading of the present specification, particularly when viewed in the light of the drawings, in which:

FIG. 2 is a sectional view of a fragment of the neutronic reactor shown in FIG. 1 showing one of the process tubes ready to be discharged by the one irradiation period method;

FIG. 3 is a view of the process tube shown in FIG. 2 after the discharge operation has commenced;

FIG. 4 is a view of the process tube shown in FIG. 2 being segmentally charged;

FIG. 5 is a further view of the process tube shown in FIG. 2 as the segmented operation of the tube nears its conclusion;

FIG. 6 is a graph showing the average exposure of the discharged body from a process tube of a neutronic reactor for different discharge segments relative to the average exposure of bodies irradiated in a single period, the maximum exposure of any body being the same in all cases;

FIG. 7 is a graph showing the relation of the average ratio of $Pu^{240}$ to $Pu^{239}$ in the yield of plutonium from a neutronic reactor to the segment discharged from a process tube of the neutronic reactor, the average exposure of the discharged bodies being the same in all cases;

FIG. 8 is a longitudinal sectional view of a gripper slug and shielding slug;

FIG. 9 is a sectional view taken along line 9—9 of FIG. 8; and

FIG. 10 is a sectional view taken along line 10—10 of FIG. 5.

Figure 1:
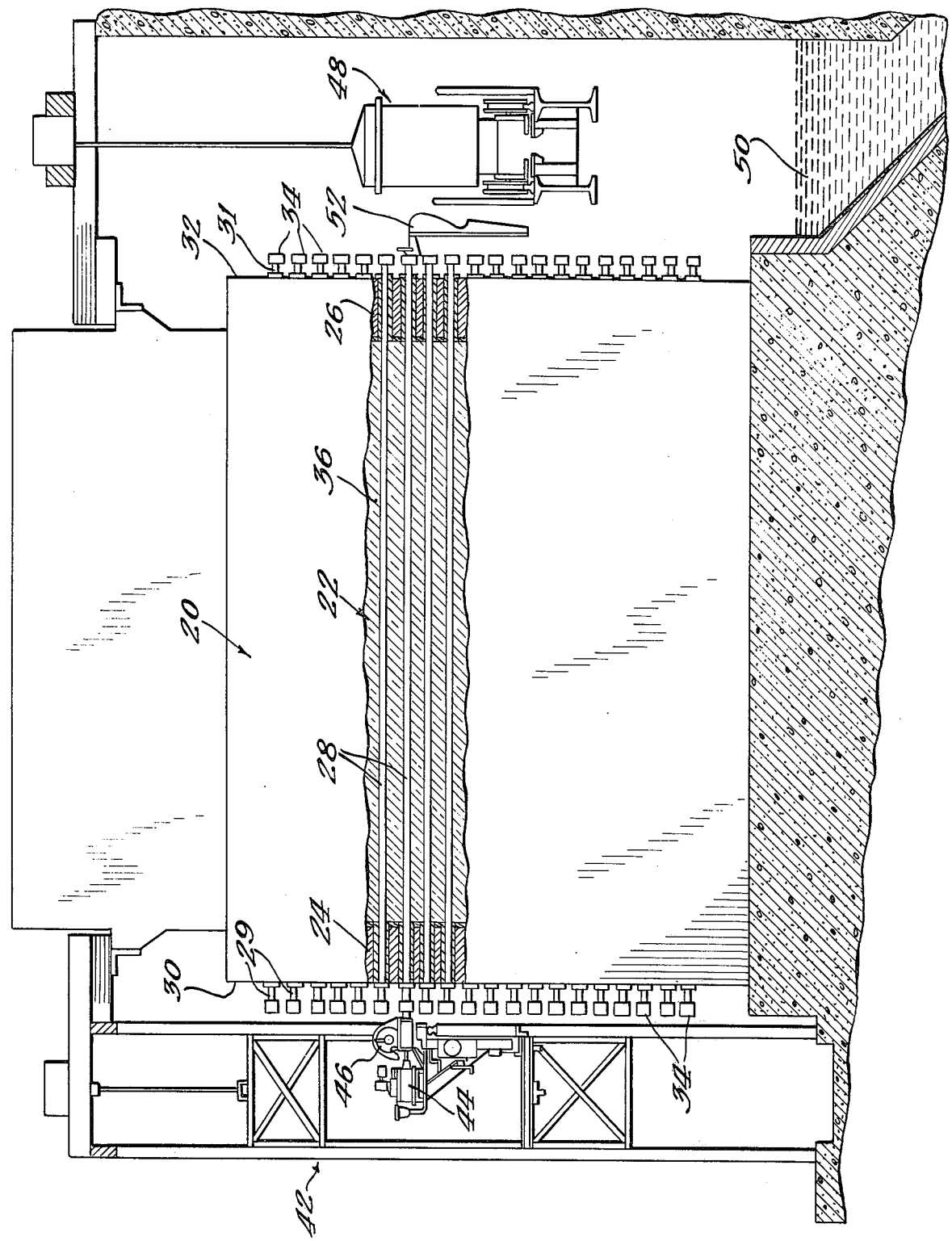
FIG. 1 is a side elevational view of a neutronic reactor equipped for segmented operation partially cut away and in section.

FIG. 1 illustrates generally a neutronic reactor 20 having an active portion 22 with radiation shields 24 and 26 at the sides thereof. Process tubes 28 traverse the shields 24 and 26 and the active portion 22, one end 29 of the process tubes 28 emerging from a charging face 30 and the other end 31 emerging from a discharging face 32 of the reactor 20. The ends 29 and 31 of the process tubes 28 are provided with caps 34 to seal them.

The active portion 22 of the reactor 20 consists of a moderator 36 constructed of a material having a low neutron capture cross section and small atomic number, such as graphite, and bodies containing thermal neutron fissionable material 38 which are disposed within the process tubes 28. The bodies 38 are cylindrical in shape with a diameter slightly smaller than the diameter of the process tubes 28, so that they may slide freely within the process tubes 28. The fissionable material contained within the bodies 38 may be any of the well knwon fissionable elements, such as plutonium or natural uranium. Some of the process tubes 28 within the active portion 22 of the reactor 20 may be used for the irradiation of other non-fissionable bodies which do not contribute to the neutron chain reaction provided that there is sufficient excess reactivity to allow the neutron chain reaction to remain self-sustaining when neutrons are absorbed in these other bodies. Radioactive isotopes, such as radioactive iodine and carbon, may thus be produced in ahy of the process tubes 28.

The process tubes 28 are provided with ribs 62 near the bottom thereof, as shown in FIG. 10, to enable the bodies 38 to slide freely. The ribs 62 also center the bodies within the process tubes 28 leaving space between the process tubes 28 and the bodies 38 for the flow of a fluid coolant.

The portions of the process tubes 28 which traverse the radiation shields 24 and 26 are filled with shielding bodies 40. The shielding bodies 40 may be constructed of any radiation absorbing material, such as lead.

A charging face elevator 42 is disposed adjacent to the charging face 30 of the reactor 20, and a pneumatic charging machine 44 and a tape reel 46 are mounted upon the elevator 42. A discharging face elevator 48 is disposed adjacent to the discharging face 32 of the reactor 20 over a pit 50 which contains water. A discharge tip-off assembly 52 is removably attached to the discharge end 31 of one of the process tubes 28 of the reactor 20. It is to be understood that FIG. 1 illustrates the reactor 20 with the charging and discharging equipment 44, 46 and 52 attached to the reactor and ready to discharge the reactor 20, and that when the reactor 20 is operating, the charging and discharging equipment 44, 46 and 52 are removed from the faces 30 and 32 of the reactor 20. The charging elevator 42 and the discharging elevator 48 are also raised above the active portion 22 of the reactor 20 when the reactor is in operation. A more detailed description of the apparatus for effecting segmental operation of the reactor appears in the application of Charles P. Cabell. Ser. No. 258,158, filed Nov. 26, 1951 now U.S. Pat. No. 3,069,337, and forms no part of the present invention. The details of the neutronic reactor 20 also form no part of the present invention, and a more detailed description thereof may be had by reference to the copending patent application of Enrico Fermi and Leo Szilard, Ser. No. 568,904, filed Dec. 19, 1944, now U.S. Pat. No. 2,708,656 or the copending patent application of Leo A. Ohlinger, Eugene P. Wigner, Alvin M. Weinberg and Gale J. Young, Ser. No. 568,900, filed Dec. 19, 1944 now U.S. Pat. No. 3,427,446.

FIG. 2 shows the disposition of the fissionable bodies 38 and shielding bodies 40 in the process tube 28 at the end of a period of irradiation, all of the bodies having been charged into the process tube 28 at the same time. The bodies have been designated 38a and dotted to indicate that the bodies have been irradiated through at least one period of irradiation, while the designation 38 is used to indicate bodies in general and 38b is used to designate bodies before irradiation. In order to discharge a segment of the irradiated bodies 38a in a process tube 28, the caps 34 are removed from the ends of the process tube after lowering the charging and discharging elevators 42 and 48 to a position adjacent to the process tube 28 which is to be discharged. The shielding bodies 40 adjacent to the charging face of the reactor 20 are then removed by pushing the entire column of bodies 38 and 40 from the discharge face 32 to force the shielding bodies 40 out of the process tube 28. This step has just been accomplished as illustrated in FIG. 3, a plunger 71 being shown for this purpose.

It is necessary that the shielding bodies 40 be deposited in containers which prevent the escape of radiation from the shielding elements 40, and that operating personnel be protected from the radiations emanating from the shielding bodies 40 and the open end of the process tube 28 during this step. The irradiated bodies 38a must be pushed back into their original position, as shown in FIG. 2, before operating personnel can approach the charging face 30 of the reactor.

It may not be necessary to use shielding bodies 40 in the region of the shield 24 adjacent to the charging face 30 of the reactor, since this is only necessary when the escaping radiations from the process tube 28 constitute a health hazard to the operating personnel. In many neutronic reactors, the coolant which flows through the process tubes 28 itself provides sufficient shielding from radiations, and thus it is not necessary to use the shielding bodies 40 in the region of the shield 24. When operating a reactor without these shielding bodies 40 adjacent to the charging face 30, it is of course unnecessary to push the column of irradiated bodies 38a and shielding bodies 40 from the region of the discharge face 32 toward the charging face 30, as illustrated in FIG. 3.

The tape reel 46 may be attached to the end 29 of the process tube 28 adjacent to the charging face 30 of the reactor 20 when the irradiated bodies 38a are exposed to the charging face 30 of the reactor, but within the active portion 22 thereof, and the discharge tip-off assembly 52 may be placed on the discharge end 31 of the same process tube 28. The tape reel 46 carries a tape 54 which is slid beneath the bodies 38 and 40 in the process tube 28 and extends from the discharge end 31 of the process tube 28. The process tubes 28 are provided with ribs 62 on their lower surfaces to support the fuel elements 38, and the tape 54 slides freely between the ribs.

A gripper slug 56 with dimensions similar to those of the bodies 38 is attached to the end of the tape 54 at the discharge face 32 of the reactor 20. Details of the gripper slug are covered in the patent application of Henry J. Bellarts, Ser. No. 258,165, filed Nov. 26, 1951 now U.S. Pat. No. 3,059,303. However, for purposes of understanding the present invention, it must be stated that the gripper slug is a device with jaws 64 and 65 for removably gripping the tape 54, as illustrated in FIGS. 8 and 9. The jaw 64 is movable relative to the jaw 65 by rotation of a locking pin 66 which is provided with two eccentrically disposed portions 67 and 68. The gripper slug 56 is provided with a protruding pin 60 for attaching a shielding slug 58, the two slugs 56 and 58 being together and positioned beneath the discharge tip-off assembly 52. The gripper slug 56 and shielding slug 58 should be disposed out of the path of falling bodies, either by mechanical or magnetic means. Operating personnel perform these functions by remote means from the discharge elevator 48. They now leave the discharge face 32 of the reactor 20, and the discharge elevator 48 is raised above the process tube 28 being discharged.

New unirradiated bodies 38b (shown undotted) are inserted into the process tube 28 from the charging end 29. However, all of the irradiated bodies 38a are not forced from the discharge end 31 of the process tube 28, but only about three-fourths of the total length of irradiated bodies 38a are so removed and replaced by new bodies 38b. Shielding bodies 40 are then inserted into the tube 28 following the insertion of new bodies 38b, as illustrated in FIG. 4, the portion of the tape 54 within the tube 28 being too small for illustration.

The tape 54 has been removed from the reel 46 to permit the insertion of bodies 38b and 40 into the tube 28. It is new replaced and wound upon the reel 46, causing the gripper slug 56 and shielding slug 58 to slide across the discharge tip-off assembly 52 into the discharge end 31 of the process tube 28. By further exerting force upon the tape 54, the bodies 40, 38b, and 38a may be forced toward the charging face 30 of the reactor 20, and assume the positions shown in FIG. 5. A shielding body 40 may be inserted at the discharge end of the process tube 28 for the gripper slug 56, and the gripper slug 56 may be removed from the tape 54. The shielding slug 58 remains in place when the gripper slug 56 is removed, since the pin 60 is free to pull out of the shielding slug 58. The tape reel 46 and the discharge tip-off assembly 52 may be removed from the ends 29 and 31 of the process tube 28, and the caps 34 may be replaced upon the ends 29 and 31 of the process tube 28. It is possible to lower and use the discharge elevator 48 for these purposes, since the shielding slug 58 restricts the escape of radiation from the open end 31 of the process tube 28. The elevator 42 and 48 are then raised above the faces 30 and 32 of the reactor 20, and the neutronic chain reaction may again be permitted to rise to operating level. A flow of coolant water through the process tubes 28 may be provided in order to remove the heat generated by the absorption of radiation and particles in the bodies 38 and other elements of the reactor 20, as is well known in the art.

While the reactor disclosed uses natural uranium, the present invention may be practiced using other fissionable materials. For example, the reactor disclosed could utilize a mixture of $U^{235}$ and thallium mixed with one part of $U^{235}$ to 139 parts of thallium to replace the natural uranium. In this case, the thallium is converted to radioactive forms.

If natural uranium is utilized for the fissionable material which is used to maintain the neutronic chain reaction, it also is transformed by the process of the neutronic chain reaction. Natural uranium contains atoms of several isotopes, including the isotope $U^{235}$, which are readily fissioned by thermal energy neutrons, and is able to sustain a neutronic chain reaction. Natural uranium also contains the isotope $U^{238}$ which converts to $U^{239}$ when it absorbs a neutron. $U^{239}$ is converted to $Np^{239}$ by beta decay, and $Np^{239}$ in turn is converted by beta decay to $Pu^{239}$. $Pu^{239}$ is a transuranic element, and can be separated from unconverted natural uranium by chemical methods. Since it is fissionable by thermal energy neutrons in a manner similar to uranium 235, it is valuable for enriching natural uranium in other chain reacting systems, usually of smaller overall size.

However, $Pu^{239}$ also captures neturons to form $Pu^{240}$. This isotope of plutonium exhibits the property of "self-fission", i.e. an atom of $Pu^{240}$ will spontaneously divide itself into atoms of lower atomic number and give off radiation and neutrons in the process. For this reason, Pu $^{240}$ is generally considered to be an impurity in the yield of Pu$^{239}$ produced by a neutronic chain reaction using uranium 238, and it is desirable to minimize the production of Pu$^{240}$.

Segmental discharge also offers an advantage when the reactor is operated to produce the maximum concentration of product without exceeding a certain limit on the amount of contaminant formed. Under these circumstances, continued irradiation of the desired product which has been formed as a result of the operation of the reactor results in the formation of additional contaminant. The amount of contaminant present in any body is proportional to the square of the amount of product formed in the body, provided the total amount of product formed is small compared to the amount of material remaining from which the product is formed. Hence, it is clear that for a given amount of product formed during irradiation of a charge of bodies, less contaminant will be formed if all bodies have about the same amount of product than is formed when some bodies have a larger amount of product and others have a smaller amount of product.

As explained above, it is possible to obtain a greater average exposure of the bodies in a tube of neutronic reactor with a given neutron flux density by means of segmented discharge than could be obtained with the same neutron flux density when discharging the entire tube at one time. It has also been found, as shown by FIG. 7, that the average ratio of Pu$^{240}$ to Pu$^{239}$ that a neutronic reactor of the type described will yield for discharge segments less than 100% of the process tube is less than the same ratio when discharged by 100% segments, the average exposure of the discharged bodies being held the same in all cases. It will be noted from the Figure, that the proportion of Pu$^{240}$ to Pu$^{239}$ rises sharply when the discharge segment exceeds 80% of the total charge in the process tube. It is also to be noted from the Figure, that with not more than two periods of irradiation for any body, the reduction in the ratio of Pu$^{240}$ to Pu$^{239}$ does not greatly fall for smaller fractions of discharge than 80% and has a minimum in the neighborhood of 70–75% of the total charge in the process tube. This ratio can be expected to fall even further for fractional discharges less than 50%, but since this will require at least some of the bodies within the process tube to be irradiated more than twice before obtaining their total exposure, the economic disadvantage is deemed to be more important than the decrease in the yield of Pu$^{240}$.

Segemented discharge not only reduces the proportion of Pu$^{240}$ to Pu$^{239}$ in a natural uranium reaction, but may be used to reduce the yield of any element which is formed by a double absorption, as in the case of Pu$^{240}$, with respect to an element which is converted by a single neutron absorption.

As indicated in FIG. 6, the exposure that a body may receive when a neutronic reactor is segmentally discharged will be a maximum when the discharge segment is approximately three-fourths of the total charge in the process tube. The optimum discharge segment will vary slightly depending upon the neutron flux distribution along the tube in the reactor, since the more flattened this flux distribution, the longer will be the optimum discharge segment be. If it is assumed, that the neutron flux distribution along the length of a process tube is given by the expression "$\phi = A \sin x$" where $\phi$ is the neutron flux, A is a constant depending upon the position of the tube relative to the center of the active portion of the reactor and $x$ is the distance from one end of the tube ranging from 0 to $\pi$, then it may be shown mathematically that for a given average exposure, the maximum exposure of any body in the tube will be a minimum where the discharge segment is two-thirds of the total length of the tube. With a discharge segment of two-thirds the length of the process tube, it is clear that the ratio of the average exposure of the discharged bodies to the maximum exposure of a body will be higher than is possible with any other discharge segment in excess of 50% of the total segment.

From the foregoing it is clear that the segmental discharge may be about two-thirds or three-fourths of the total number of bodies in the reactor tube at any one time to be irradiated. This means that one-half or one-third of the bodies are irradiated once and one-half or two-thirds of the bodies are irradiated twice. More particularly, a first end region of the active portion 22 toward the charging face 30 is one-third or one-fourth of the length of the active portion, a second end region of the active portion 22 toward the discharging face 32 is one-third or one-fourth of the length of the active portion, and intermediate region of the active portion 22 lying between the first and second end regions is one-third or one-half of the length of the active region. Thus the group of bodies 38*b* in the said first end region are irradiated once here and are irradiated again when they are in the said second end region, where they are designated at 38*a*, whereas the group of bodies 38*b* in the said intermediate region are irradiated only once.

The man skilled in the art will devise many modifications of the methods of operating the neutronic reactor herein disclosed, and will discover many advantages not specifically set forth. For these reasons, it is intended that the scope of the present invention be limited by the appended claims, rather than the specific disclosure.

What is claimed is:

1. A method of operating a reactor having an active portion of a given length between a charging end and a discharging end, a first end region of the reactor extending from the charging end for one-fourth to one-third of said given length, a second end region extending from the discharging end for one-fourth to one-third of said given length, and a middle region extending between said end regions, said method comprising the steps of inserting end to end in the active region through the charging end a first group of bodies filling the middle region and a second group of bodies filling the first end region, irradiating the first and second groups of bodies while in the middle and first end regions, removing the first group from the reactor through the second end region, shifting the second group through the middle region to the second end region, inserting new first and second groups of bodies through the charging face into the middle and first end regions of the reactor, respectively, and irradiating the original second group and the new first and second groups while in the second end, middle, and first end regions, respectively, removing the original second group and the new first group from the reactor through the second end region, shifting the new second group through the middle region to the second end region, and irradiating the new second group again, whereby the first groups of bodies are irradiated only once and the second groups are irradiated twice.

* * * * *